(12) United States Patent
Hong

(10) Patent No.: US 11,150,057 B2
(45) Date of Patent: Oct. 19, 2021

(54) METHOD AND DEVICE FOR PROVIDING BETTING DART GAME, AND COMPUTER PROGRAM

(71) Applicant: PHOENIXDARTS CO., LTD., Seoul (KR)

(72) Inventor: Sang Uk Hong, Gangnam-gu Seoul (KR)

(73) Assignee: PHOENIXDARTS CO., LTD., Seoul (KR)

( * ) Notice: Subject to any disclaimer, the term of this patent is extended or adjusted under 35 U.S.C. 154(b) by 72 days.

(21) Appl. No.: 15/755,017

(22) PCT Filed: Sep. 1, 2016

(86) PCT No.: PCT/KR2016/009789
§ 371 (c)(1),
(2) Date: Feb. 23, 2018

(87) PCT Pub. No.: WO2017/039351
PCT Pub. Date: Mar. 9, 2017

(65) Prior Publication Data
US 2019/0249962 A1    Aug. 15, 2019

(30) Foreign Application Priority Data
Sep. 1, 2015   (KR) .......... 10-2015-0123547

(51) Int. Cl.
*F41J 5/14* (2006.01)
*A63F 13/46* (2014.01)
(Continued)

(52) U.S. Cl.
CPC .................. *F41J 5/14* (2013.01);
*A63F 9/02* (2013.01); *A63F 13/35* (2014.09);
*A63F 13/352* (2014.09);
(Continued)

(58) Field of Classification Search
CPC .. A63F 9/24; G06F 17/00; A63D 15/00; F41J 5/14
See application file for complete search history.

(56) References Cited

U.S. PATENT DOCUMENTS 9,047,736 B2   6/2015  Lempel et al.
2004/0033825 A1  2/2004  Newton et al.
(Continued)

FOREIGN PATENT DOCUMENTS

JP   2010240439 A   10/2010
JP   5733813 B2    6/2015
(Continued)

OTHER PUBLICATIONS

International Search Report & Written Opinion dated Dec. 16, 2016 from PCT Application No. PCT/KR2016/009789.
(Continued)

*Primary Examiner* — Eugene L Kim
*Assistant Examiner* — Christopher Glenn
(74) *Attorney, Agent, or Firm* — Innovation Capital Law Group; Vic Lin

(57) ABSTRACT

The present disclosure relates to a method for providing a betting dart game. The betting dart game method is provided to induce an interest and tension of a user, thereby enhancing fun of a game.

10 Claims, 5 Drawing Sheets

(51) Int. Cl.
    *F41J 3/00*     (2006.01)
    *G07F 17/32*    (2006.01)
    *A63F 13/352*   (2014.01)
    *A63F 13/795*   (2014.01)
    *F41J 3/02*     (2006.01)
    *A63F 9/02*     (2006.01)
    *A63F 13/65*    (2014.01)
    *A63F 13/837*   (2014.01)
    *A63F 13/35*    (2014.01)
    *A63F 13/79*    (2014.01)

(52) U.S. Cl.
    CPC .............. *A63F 13/46* (2014.09); *A63F 13/65* (2014.09); *A63F 13/79* (2014.09); *A63F 13/795* (2014.09); *A63F 13/837* (2014.09); *F41J 3/0009* (2013.01); *F41J 3/02* (2013.01); *G07F 17/3202* (2013.01); *G07F 17/3262* (2013.01); *G07F 17/3295* (2013.01)

(56) References Cited

U.S. PATENT DOCUMENTS

| | | | | |
|---|---|---|---|---|
| 2005/0075153 | A1* | 4/2005 | Valero Moreno | G07F 17/38 463/1 |
| 2006/0135252 | A1* | 6/2006 | Amaitis | G07F 17/3223 463/25 |
| 2008/0090679 | A1* | 4/2008 | Browne | A63B 24/0003 473/422 |
| 2008/0234021 | A1 | 9/2008 | Palmer et al. | |
| 2009/0061978 | A1* | 3/2009 | Ahlin | G06Q 30/02 463/16 |
| 2010/0032904 | A1* | 2/2010 | Yasuoka | A63F 13/812 273/317.2 |
| 2010/0038854 | A1* | 2/2010 | Mraz | F41J 5/056 273/371 |
| 2010/0103093 | A1* | 4/2010 | Izumi | G06F 3/0334 345/156 |
| 2010/0261520 | A1 | 10/2010 | Lempel et al. | |
| 2011/0034260 | A1* | 2/2011 | Owen | A63D 15/20 473/1 |
| 2011/0269520 | A1* | 11/2011 | Amaitis | G06Q 50/10 463/16 |
| 2012/0115577 | A1* | 5/2012 | Kaneko | G07F 17/3244 463/20 |
| 2012/0242043 | A1* | 9/2012 | Hong | F41J 5/14 273/348 |
| 2012/0258788 | A1* | 10/2012 | Hong | A63F 13/80 463/25 |
| 2013/0210530 | A1 | 8/2013 | Nguyen | |
| 2014/0256445 | A1* | 9/2014 | Amaitis | A63F 13/795 463/40 |
| 2014/0265130 | A1* | 9/2014 | Layne, IV | F41J 3/0071 273/358 |
| 2014/0265132 | A1* | 9/2014 | Layne, IV | F41J 5/00 273/371 |
| 2014/0274342 | A1* | 9/2014 | Nguyen | G07F 17/3211 463/25 |
| 2014/0302918 | A1* | 10/2014 | Minitzer | G07F 17/323 463/26 |
| 2015/0045110 | A1 | 2/2015 | Lempel et al. | |
| 2015/0145211 | A1* | 5/2015 | Hong | F41J 5/04 273/371 |
| 2015/0145212 | A1* | 5/2015 | Hong | G07F 17/323 273/371 |
| 2015/0233684 | A1* | 8/2015 | Narita | F41J 3/0042 273/376 |
| 2016/0364953 | A1 | 12/2016 | Hong | |

FOREIGN PATENT DOCUMENTS

| | | |
|---|---|---|
| KR | 20030012876 A | 2/2003 |
| KR | 20070062658 A | 6/2007 |
| KR | 20090001066 A | 1/2009 |
| KR | 20130089822 A | 8/2013 |
| KR | 101528564 B1 | 6/2015 |
| KR | 20150059923 A | 6/2015 |
| WO | 2015076495 A1 | 5/2015 |

OTHER PUBLICATIONS

European Search Report dated Mar. 22, 2019 from European Application No. 16842317.6, 4 pages.

* cited by examiner

METHOD AND DEVICE FOR PROVIDING BETTING DART GAME, AND COMPUTER PROGRAM

TECHNICAL FIELD

The present disclosure relates to a method for providing a betting dart game, and more particularly, to a method for providing a betting dart game through betting of items.

BACKGROUND ART

In general, a dart refers to a 'small arrow' and is a game that makes marks by throwing an arrow-shaped dart pin to a centrifugal target marked with figures. The dart game has an advantage in that anybody can enjoy the dart game anytime and anywhere if there are only an arrow-headed dart and the dart target. In recent years, as various game methods have been developed and scoring methods have been organized, the dart game has been developed as worldwide leisure, and therefore, men and women of all ages have conveniently enjoyed the dart game.

In the case of a game in which participants contend for victory under commodity or certain promise, an interest and tension of the participants are raised to increase fun of the game. In modern society, this is defined as "betting". Particularly, a "betting game" can cause a modern person to obtain life vitality by getting tangled tension to the modern person who is easy to lapse into usual feeling of boredom or emotional insecurity. However, in a dart game method in the related art, there was only a game method for enhancing concentration through the dart game or enhancing throwing accuracy by hitting the dart pin at a predetermined location of the dart target.

Korean Patent Unexamined Publication No. KR2003-0012876 proposes a betting game method in which betting is made based on a possibility that a random result is generated by providing the betting game. As described above, there is a need in the art to develop a betting game that causes the interest and tension of the participants in playing the dart game. In addition, there is a need to provide a sound betting dart game by betting items except money transaction and playing the game.

DISCLOSURE

Technical Problem

The present disclosure has been made in an effort to provide a betting dart game method in order to induce an interest and tension of a user, thereby enhancing fun of a game.

The present disclosure has been made in an effort to provide a sound betting dart game through item betting.

Technical Solution

According to an embodiment of the present disclosure, a method for providing a betting dart game is disclosed. The method for providing a betting dart game may include: registering first user information and second user information including at least one item information received from first user equipment and second user equipment; receiving a betting dart game request from the second user equipment that selects the registered first user information; transmitting the received betting dart game request and the second user information to the first user equipment and determine whether to play the betting dart games of first and second users based on a response from the first user equipment; receiving one or more scores calculated through the betting dart game from a dart game apparatus; determining winning or losing of the first user and the second user according to a predetermined winning or losing criterion based on the one or more received scores and generating one or more item movement information based on the determined winning or losing; and transmitting one or more generated item movement information to the dart game apparatus or a game server.

According to an embodiment of the present disclosure, disclosed is a computer program stored in a computer readable medium and causing a computer to execute the operations. Herein, the operations may include: an operation of registering first user information and second user information including at least one item information received from first user equipment and second user equipment; an operation of receiving a betting dart game request from the second user equipment that selects the registered first user information; an operation of transmitting the received betting dart game request and the second user information to the first user equipment and determining whether to play the betting dart games of first and second users based on a response from the first user equipment; an operation of receiving one or more scores calculated through the betting dart game from a dart game apparatus; an operation of determining winning or losing of the first user and the second user according to a predetermined winning or losing criterion based on the one or more received scores and generating one or more item movement information based on the determined winning or losing; and an operation of transmitting one or more generated item movement information to the dart game apparatus or a game server.

According to an embodiment of the present disclosure, a dart game apparatus is disclosed. The dart game apparatus may include: a reception unit receiving first user information and second user information including one or more item information from first user equipment and second user equipment, the reception unit receiving a betting dart game request from the second user equipment selecting the registered first user information and receiving a response from the first user equipment; a user recognition unit registering first user information and second user information including the one or more received item information; a controller determining whether to play betting dart games of a first user and a second user based on the response from the first user equipment, calculating one or more scores calculated through the determined betting dart game, determining winning or losing of the first user and the second user according to a predetermined winning or losing criterion based on the calculated one or more scores, and generating one or more item movement information based on the determined winning or losing; and a transmission unit transmitting the received betting dart game request and the second user information to the first user equipment and transmitting the one or more generated item movement information to the dart game apparatus or a game server.

According to an embodiment of the present disclosure, a dart game server is disclosed. The dart game server may include: a reception module receiving first user information and second user information including one or more item information from first user equipment and second user equipment, the reception module receiving a betting dart game request from the second user equipment selecting the first user information and receiving a response from the first user equipment; a user registration module registering first user information and second user information including the one or more received item information; a control module determining whether to play betting dart games of a first user and a second user based on the response from the first user equipment, calculating one or more scores calculated through the determined betting dart game, determining winning or losing of the first user and the second user according to a predetermined winning or losing criterion based on the calculated one or more scores, and generating one or more item movement information based on the determined winning or losing; and a transmission module transmitting the received betting dart game request and the second user information to the first user equipment and transmitting the one or more generated item movement information to the dart game apparatus or a game server.

Advantageous Effects

According to an embodiment of the present disclosure, a betting dart game method is provided to induce an interest and tension of a user, thereby enhancing fun of a game.

According to an embodiment of the present disclosure, a sound betting dart game can be provided through item betting.

DESCRIPTION OF DRAWINGS

Some of embodiments are illustrated in the accompanying drawings so as to appreciate features of the mentioned disclosed contents with reference to the following embodiments through detailed and specific and more concrete description. Further, it is intended that like reference numerals in the drawing denote the same or similar function throughout several aspects. However, the accompanying drawings just illustrate only specific typical embodiments of the disclosed contents and are not considered to limit the scope of the present disclosure and it should be noted that other embodiments having the same effect can be sufficiently recognized.

BEST MODE

Various embodiments and/or aspects will be now disclosed with reference to drawings. In the following description, for the purpose of a description, multiple detailed matters will be disclosed in order to help comprehensive appreciation of one or more aspects. However, those skilled in the art will recognize that the aspect(s) can be executed without the detailed matters. In the following disclosure and the accompanying drawings, specific exemplary aspects of one or more aspects will be described in detail. However, the aspects are exemplary and some of various methods in principles of various aspects may be used and the descriptions are intended to include all of the aspects and equivalents thereof.

Further various aspects and features will be presented by a system which can include multiple devices, components, and/or modules. It should also be appreciated and recognized that various systems can include additional apparatuses, components, and/or modules and/or that the various systems cannot include all of apparatuses, components, modules, and the like discussed in association with the drawings.

In "embodiment", "example", "aspect", "illustration", and the like used in the specification, it may not be construed that a predetermined aspect or design which is described is more excellent or advantageous than other aspects or designs. 'Component', 'module', 'system', 'interface', and the like which are terms used below generally mean computer-related entities and mean, for example, hardware, a combination of the hardware and software, and the software.

Moreover, the term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to all of the case where X uses A, the case where X uses B, and the case where X uses both A and B. Further, it should be understood that the term "and/or" used in the specification designates and includes all available combinations of one or more items among enumerated related items.

In addition, the word "comprises" and/or "comprising" means that the corresponding feature and/or component is present, but it should be appreciated that presence or addition of one or more other features, components, and/or a group thereof is not excluded. Further, when not separately specified or not clear in terms of the context that a singular form is indicated, it should be construed that the singular form generally means "one or more" in the present specification and the claims.

Further, the terms "information" and "data" used in the specification may also be often used to be exchanged with each other.

Figure 1:
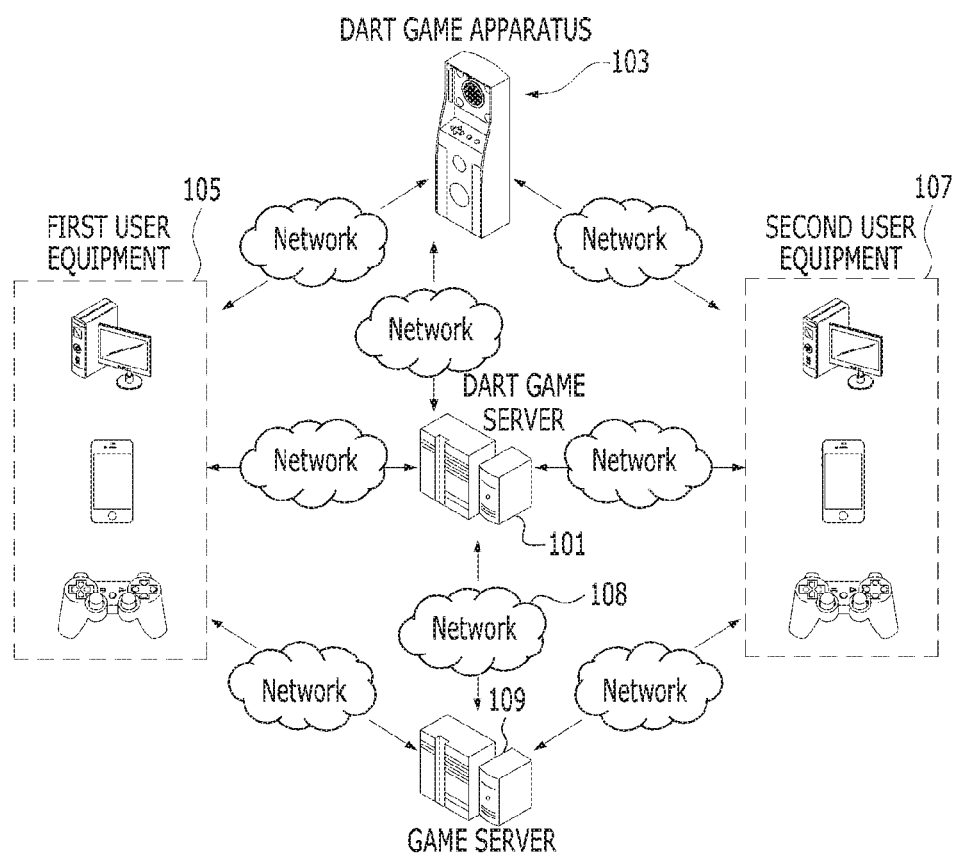
FIG. 1 illustrates an overall system according to an embodiment of the present disclosure.

FIG. 1 illustrates an overall system according to an embodiment of the present disclosure.

According to an aspect of the present disclosure, as illustrated in FIG. 1, the system may include a dart game server 101, a dart game apparatus 103, first user equipment 105, second user equipment 107, a network 108, and a game server 109.

Components constituting the system illustrated in FIG. 1 are exemplary and only some of the components may constitute the system or an additional component(s) may be included in the system in addition to the components. For example, the dart game server 101 may include an enterprise application integration (EAI) server, a result data receiving server of an external search engine, a dart game operating server, and/or a call center server.

According to an aspect of the present disclosure, the dart game server 101, the dart game apparatus 103, the first user equipment 105, the second user equipment 107, and the game server 109 may transmit/receive various information through the network 108.

The dart game server 101 may perform communication with the first user equipment 105, the second user equipment 107, and the dart game apparatus 300, collection of betting dart game request information, betting dart game response information, dart game winning or losing information, and dart game data, collection of result data of an external search engine, storage of dart game user information, game data, ranking information, rating information, and feedback information, creation, distribution, and storage of an application for a terminal, and the like.

Such various information may mean, for example, user information including user identification information and one or more item information, a score of the game, an overall ranking, a level, maximum combo information, maximum successive winning information, lowest score information, a dart pin trajectory, a dart pin throwing operation, and proximity and a delay time of hit dart pins.

The aforementioned information may be input through the first user equipment 105 and the second user equipment 107 or input by the dart game apparatus 103. The aforementioned information may be stored in a database or a computer-readable storage medium of the dart game server 101. According to an aspect of the present disclosure, the computer-readable storage medium may be included in the dart game apparatus 103.

The storage medium may include all kinds of storage media storing programs and data so as to be readable by a computer system. According to an aspect of the present disclosure, the media may include a read only memory (ROM), a random access memory (RAM), a compact disk (CD)-ROM, a digital video disk (DVD)-ROM, a magnetic tape, a floppy disk, an optical data storage device, and the like and also include a medium implemented in the form of a carrier wave (for example, transmission through the Internet). Additionally, the media are distributed to systems connected through the network 108 to store computer readable codes and/or commands in a distribution scheme.

According to an embodiment of the present disclosure, the first user equipment 105 and the second user equipment 107 may be referred to as user equipment, a mobile, a PC which may communicate wirelessly, a portable phone, a kiosk, a cellular phone, a cellular, a cellular terminal, a game machine, a subscriber unit, a subscriber station, a mobile station, a terminal, a remote station, a PDA, a remote terminal, an access terminal, a user agent, a portable device having a wireless connection function, a predetermined device which may use a wireless connection mechanism, such as a wireless modem, and the like, but are not limited thereto. Herein, the game machine may be the dart game apparatus 100 personally owned by a first user or a second user.

Further, the first user equipment 105 and the second user equipment 107 may be referred to as a predetermined device capable of using a wired connection mechanism, such as a wired facsimile, a PC including a wired modem, a wired telephone, a terminal which may communicate by a wired type, or the like, but are not limited thereto.

In an embodiment of the present disclosure, when specific applications distributed by a dart game company are installed and executed in the first user equipment 105 and the second user equipment 107, the dart game server 101 may communicate with the first user equipment 105 and the second user equipment 107 through the network 108 so that a dart game user and a dart game company employee may enjoy various corresponding services.

Hereinafter, the first user equipment 105 and the second user equipment 107 will be collectively referred to as the user equipment. Alternatively, when specific technical features of the present disclosure are described, the specific technique features will be described by using the first user equipment 105 and the second user equipment 107.

In an aspect of the present disclosure, the dart game server 101 may provide different services to various types of user equipment, respectively. For example, an access of each user equipment, such as the mobile, the PC, and the game machine, to a specific server of a plurality of dart game servers may be allowed or restricted, depending on policies and/or user settings of the game company. Alternatively, different settings may be provided for types and functions of applications distributed to each user equipment. Further, depending on the policies and/or settings of the dart game server, each user equipment may have different input and output screens.

According to an embodiment of the present disclosure, the network 108 may form a channel for data communication among the dart game server 101, the dart game apparatus 103, the user equipment, and the game server 109. "System" and "network" which are terms used in the present specification may often be used to be replaced with each other.

The network 108 presented herein may use various wired communication systems such as public switched telephone network (PSTN), x digital subscriber line (xDSL), rate adaptive DSL (RADSL), multi rate DSL (MDSL), very high speed DSL (VDSL), universal asymmetric DSL (UADSL), high bit rate DSL (HDSL), and local area network (LAN). Further, the network 108 presented herein may use various wireless communication systems such as code division multi access (CDMA), time division multi access (TDMA), frequency division multi access (FDMA), orthogonal frequency division multi access (OFDMA), single carrier-FDMA (SC-FDMA), and other systems.

The techniques described in the present specification may be used in other networks in addition to the aforementioned networks.

The network 108 according to an aspect of the present disclosure may be configured regardless of communication modes such as wired and wireless modes and constituted by various communication networks including a personal area network (PAN), a wide area network (WAN), and the like. Further, the network 108 may be the known World Wide Web (WWW) and may adopt a wireless transmission technology used for short-distance communication, such as infrared data association (IrDA) or Bluetooth.

As illustrated in FIG. 1, according to an embodiment of the present disclosure, the dart game server 101 may collect game data, one or more item information, and multimedia information of a user from the dart game apparatus 103 through the network 108. Further, the dart game server 101 may collect information including information other than the game data, one or more item information, and multimedia information. For example, the dart game server 101 may also collect information such as dart game contest information, tournament information, and league information. The game data described herein may include one or more scores.

According to an embodiment of the present disclosure, the dart game server 101 may receive user information (e.g., first user information and second user information) received from the user equipment. Further, the dart game server 101 may transmit a betting dart game request and the second user information received from the second user equipment to the first user equipment. Further, the dart game server 101 may determine winning or losing of the first user and the second user based on the game data received from the dart game apparatus 103. In such a case, the dart game server 101 may generate one or more item movement information based on the determined winning or losing. Furthermore, the dart game server 101 may transmit one or more generated item movement information to the game server 109 or the dart game apparatus 103. A method for providing the betting dart game to be described below will be described in detail in FIG. 4.

Figure 2:
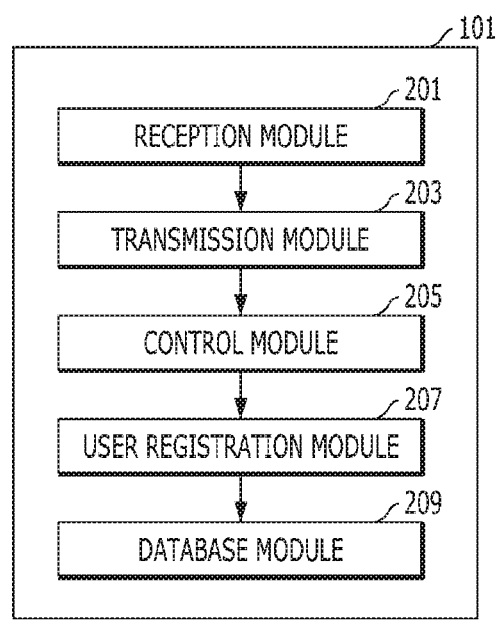
FIG. 2 illustrates components of a dart game server according to an embodiment of the present disclosure.

FIG. 2 illustrates components of a dart game server according to an embodiment of the present disclosure.

The dart game server 101 according to an aspect of the present disclosure may include a dart server, a result data receiving server of an external search engine, a speech to text (STT) server, and a combination thereof.

According to an aspect of the present disclosure, the dart game server 101 may include a reception module 201, a transmission module 203, a control module 205, a user registration module 207, and a database module 209. The components constituting the dart game server 101 of FIG. 2 are exemplary and only some of the components may constitute the dart game server 101 or an additional component(s) other than the components may be included in the dart game server 101.

According to an embodiment of the present disclosure, the reception module 201 may collect and/or receive the game data from the dart game apparatus 103 through the network 108. Further, the reception module 201 may receive the betting dart game request and a response to the request from the user equipment. Additionally, the reception module 201 may receive various information including the game data, the user information, and the like from the dart game apparatus 103.

In an aspect of the present disclosure, the reception module 201 may receive the game data in real time. For example, the reception module 201 may receive the dart game data in real time when one dart game ends. In this case, the game data may be stored in the database module 209 by the control module 205. Therefore, the received game data may be evaluated, updated, and/or eliminated in real time.

In an aspect of the present disclosure, the transmission module 203 of the dart game server 101 may transmit the received betting dart game request and the user information including the user identification information and one or more item information to the user equipment (e.g., the first user equipment). Further, the transmission module 203 can transmit the aforementioned information to plural equipment at a time. Additionally, the transmission module 203 may also transmit information other than the betting dart game request and the user information to the user equipment.

In an aspect of the present disclosure, the transmission module 203 may transmit information regarding whether to play the betting dart game to the dart game apparatus 103. In this case, the dart game apparatus 103 may play the dart game based on the received information. Further, the transmission module 203 may transmit the winning or losing information calculated based on the received game data to the dart game apparatus 103 and the user equipment. Herein, the dart game apparatus 103 may calculate the winning or losing information and the dart game server 101 may collect the calculated winning or losing information. Additionally, the transmission module 203 may transmit to the game server 109 one or more item movement information generated based on the calculated winning or losing information. Further, the transmission module 203 may distribute an application including a user interface related to the dart game to the user equipment.

According to an embodiment of the present disclosure, the dart game server 101 may include the control module 205. The control module 205 may control all operations of the dart game server 101. The control module 205 may calculate the dart game ranking based on the user information (e.g., a score, winning or losing information, successive winning information, a user level, etc. of a participation game). In addition, when the score of the game is the same in the dart game data, the control module 205 may designate the ranking of the player having a lower level as a higher ranking.

According to an embodiment of the present disclosure, the control module 205 may generate game mode information, real-time and/or non-real-time match-up mode information, and game count information. The information generated at this time may be generated when the betting dart game request is received from the user equipment. Alternatively, the aforementioned information may be generated or selected by an agreement between the first user and the second user. Additionally, the control module 205 may determine whether to play the dart game. In this case, the control module 205 may determine whether to play the dart game based on the response to the betting dart game request received from the user equipment. Additionally, the control module 205 may determine winning or losing of the first user and the second user according to a predetermined winning or losing criterion based on one or more scores received from the dart game apparatus. The predetermined winning or losing criterion to be described herein will be described below in FIG. 4.

According to an embodiment of the present disclosure, the user registration module 207 may register the user information including one or more item information. In this case, the user information may be received through the reception module 201. Further, the registered user information may be updated to the user or updated based on a dart game result. The registered user information may be collected or stored in the user equipment. In addition, the user information may include a game record, a winning or losing record, successive winning information, and item acquisition information of the user. Further, the registered user information may be stored in the database module 209 through the control module 205.

In an aspect of the present disclosure, the database module 209 may store various information required to be provided to the user equipment and/or the dart game apparatus 103 and provide requested information to the user equipment and/or the dart game apparatus 103 according to requests of other components in the dart game server 101.

In an aspect of the present disclosure, the database module 209 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. In an additional aspect of the present disclosure, the dart game server 101 may operate in connection with a web storage performing a storing function of the database module 209 on the Internet.

Various embodiments described in the present specification may be implemented in a computer-readable recording medium or storage medium or a recording medium or storage medium readable by a device similar to the computer by using, for example, software, hardware, or a combination thereof.

For example, according to hardware implementation, the embodiment described herein may be implemented by using at least one of the application specific integrated circuits (ASICs), the digital signal processors (DSPs), the digital signal processing devices (DSPDs), the programmable logic devices (PLDs), the field programmable gate arrays (FPGAs), the processors, the controllers, the micro-controllers, the microprocessors, and the electric units for performing other functions. In some cases, the embodiments described in the specification may be implemented by the control module 205 itself.

As another example, according to software implementation, embodiments such as a procedure and a function described in the specification may be implemented by separate software modules. Each of the software modules may perform one or more functions and operations described in the specification. A software code may be implemented by a software application written by an appropriate program language. The software code may be stored in the database module 209 and executed by the control module 205.

Figure 3:
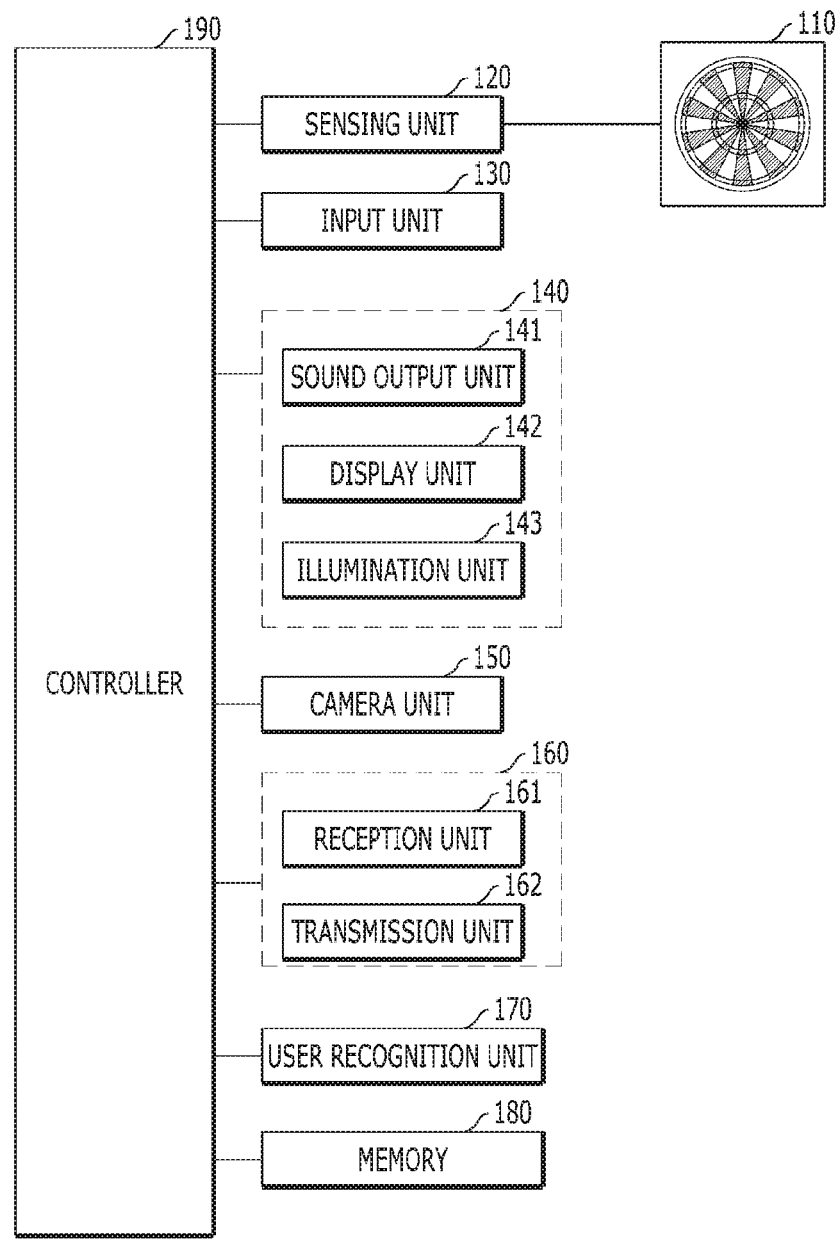
FIG. 3 is a block diagram of a dart game apparatus according to an embodiment of the present disclosure.

FIG. 3 is a block diagram of a dart game apparatus according to an embodiment of the present disclosure.

The dart game apparatus 103 according to an aspect of the present disclosure may include a dart target 110, a sensing unit 120, an input unit 130, an output unit 140, a camera unit 150, a user registration unit 155, a network connection unit 160, a user recognition unit 170, a memory 180, a controller 190, and the like. The components illustrated in FIG. 1 are not required. Therefore, the dart game apparatus having more components therethan or less components therethan may be implemented. Hereinafter, the components will be described in sequence.

The dart target 110 may include a score board in which a bullseye is positioned at the center and there are areas segmented by a concentric circle centering the bullseye and straight lines extended radially from the bullseye and granted with individual scores, respectively. Multiple holes into which a tip of a dart may be inserted may be formed on the score board.

The dart target 110 includes a display 142 to be described below to variably change score deployments of the dart target 110 and shapes of areas granted with the scores. In this case, the dart target 110 includes a light transmissive touch pad in the display 142 to be stacked to take a form of a touch screen.

The sensing unit 120 may sense a play of a dart game user performed with respect to the dart target 110. The sensing unit 120 may enable the play of an actual game user to be evaluated. The sensing unit 120 may sense which area of the dart target 110 a thrown dart pin hits, with respect to a play in which the game user throws the dart pin. The sensing unit 120 electrically converts a score corresponding to the area which the dart pin hits to transmit the converted score to the controller 190. Alternatively, the sensing unit 120 may transmit an electrical signal corresponding to the area where the dart pin hits to the controller 190 and herein, the controller 190 may calculate a score corresponding to the electrical signal.

The input unit 130 receives an input of the user for controlling the dart game apparatus 103. The input unit 130 may include a keypad, a dome switch, a touch pad (resistive/capacitive), a jog wheel, a jog switch, and the like. The input unit 130 may also include a camera 151, a microphone, or the like. Additionally, the input unit 130 may also include a short-range communication module (not illustrated) to be described below. In an embodiment of the present disclosure, the input unit 130 may be configured to include the short-range communication module (not illustrated) of the network connection unit 160. When the input unit 130 includes the short-range communication module of the network connection unit 160, the input unit 130 may be configured to receive a user input which is input by an external console device. As short-range communication technology, Bluetooth, radio frequency identification (RFID), infrared data association (IrDA), ultra wideband (UWB), ZigBee, or the like may be used. For example, when the input unit 130 performs short-range communication using infrared communication, the external console device may be an infrared remote controller. Alternatively, when the input unit 130 performs the short-range communication using a Bluetooth function, the external console device may be a mobile device including a Bluetooth module. The mobile device including the Bluetooth module may be, for example, a smart phone including the Bluetooth module.

The user may select dart pin information, item information, a dart game mode, a real-time match mode, a non-real-time match-up mode, game count information, a match-up approval, a dart game method and the number of dart game users through the input unit 130. For example, the user may select the number of dart game users, the dart game play mode (a zero one game, a cricket game, a count-up game, and the like), the dart game mode (a single play, a network play, and the like), a real-time or non-real-time match-up mode request, and a match approval through the input unit 130.

The input unit 130 receives a signal by sensing a key operation or a touch input of the user or receives speech or a motion through camera 151 or a microphone of the user to convert the received signal, speech, or motion into an input signal. To this end, a known speech recognition technology or motion recognition technologies may be used.

The output unit 140 which is used for generating an output related with sight, hearing, or touch may include a sound output unit 141, a display 142, an illumination unit 143, and the like.

The sound output unit 141 may output audio data received from the network connection unit 160 or stored in the memory 180 in a game sound effect, a game motion guide, a game method description, and the like. The sound output unit 141 may output a sound signal related with a function (e.g., a game effect sound) performed by the dart game apparatus 103. The sound output unit 141 may also output a speech of a game user or a third person using another dart game apparatus, which is received through the network connection unit 160. The sound output unit 141 may include a receiver, a speaker, a buzzer, and the like.

The display 142 may include one or more item information. Herein, one or more item information may include a dart game item, a PC game item, a mobile game item, and the like. Herein, a reception unit 161 receives the item information from the PC or the mobile and the display 142 may output the received item information on at least a part of the screen. Further, when the item information is the game item, the display 142 may output game information related with the item information. Furthermore, one or more item information may include cyber money, online coupons, and the like. In this case, the controller 190 may limit betting amounts of the cyber money and the online coupon. In addition, the controller 190 may control the betting amounts of cyber money and online coupons to be set differently based on criteria including the number of game plays, the dart game method, and the like.

Additionally, information on the winning or losing criterion may be output to at least a part of the display 142. In addition, the display 142 may output an expected score to be acquired according to the winning or losing criteria of the first user and the second user. In this case, the user may perform the dart game by being continuously aware of the winning or losing criterion in playing the dart game.

The display 142 displays (outputs) information processed in the dart game apparatus 103. Additionally, when the dart game apparatus 103 receives whether to play the betting dart game from the dart game server 101, the display 142 may output a dart game match-up screen. Further, when the dart game apparatus 103 is playing the game, the display 142 may display the score sensed through the sensing unit 120 or output an image acquired by photographing the user using another dart game apparatus received through the network connection unit 160.

The display 142 may include at least one of a liquid crystal display (LCD), a thin film transistor-liquid crystal display (TFT LCD), an organic light-emitting diode (OLED), a flexible display, and a 3D display. Some displays 142 among them may be configured as a transparent or light transmissive type to view the outside through the displays. This may be called the transparent display 142 and a representative example of the transparent display 142 includes a transparent OLED (TOLED), and the like.

In an embodiment of the present disclosure, according to an implementation form of the dart game apparatus 103, two or more displays 142 may exist. For example, in the dart game apparatus 103, the plurality of displays may be separated from each other or integrally disposed on one surface, and further, disposed on different surfaces, respectively. For example, the display 142 may include both a display disposed at an upper end of the dart target 110 and a display disposed at a lower end of the dart target 110, or may include one display thereof. However, the location where the aforementioned display is disposed is just an example, and the display may be disposed at various locations for a demand due to a design or a visual effect.

The touch sensor may be configured to convert a change in pressure applied to a specific portion of the display 142 or capacitance generated at the specific portion of the display 142 into an electrical input signal. The touch sensor may be configured to detect touch pressure as well as a touched position and area. When there is a touch input for the touch sensor, a signal(s) corresponding to the touch input is(are) sent to a touch controller. The touch controller processes the signal(s) and thereafter, transmits data corresponding thereto to the controller 190. As a result, the controller 190 may recognize which area of the display 142 is touched, and the like. In an additional aspect of the present disclosure, the aforementioned input unit 130 may be incorporated into the touch sensor of the display 142.

The illumination unit 143 outputs a signal for notifying occurrence of an event of the dart game apparatus 103. Examples of the event which occurs from the dart game apparatus 103 include identification of the dart game user, direct hit of the dart, determination of a user ranking, game over, and the like. The illumination unit 143 may include a light emission diode (LED) and notify the occurrence of the event to the user by flickering the LED. The LEDs are disposed on the bottom of the dart target 110 to be flickered according to a flickering pattern which is pre-stored according to the occurrence of the event. For example, one or more LEDs may be allocated to respective parts of the dart target 110. The allocated LEDs are disposed on the bottom of the dart target 110 and may be disposed in a direction orienting the outside of the dart game apparatus 103. When the LEDs irradiate light, the light irradiated by the LEDs may pass through the dart target 110 made of a transparent or translucent material to transfer a visual output to the user. Alternatively, the light irradiated by the LEDs may transfer the visual output to the user through a gap existing in the dart target 110. Additionally, the illumination unit 143 may be configured as a flatlight that performs diffusive general illumination and/or a spotlight that is an illumination that condenses light. Further, the illumination unit 143 may be constituted by an illumination other than the flatlight and/or the spotlight. The illumination unit 143 may output an illumination effect when the dart pin thrown by the user hits a double score, a triple score, and the bullseye. Further, the illumination unit 143 may output the illumination effect when the dart pin thrown by the user consecutively hits the double score, the triple score, and the bullseye. Additionally, the illumination unit 143 may provide an entertainment effect by outputting the illumination that condenses the light to a user who occupies a first place among the users. In this case, the users may be identified in the camera unit 150 before the start of the dart game, the identification information may be stored in the memory 180, and then the controller 190 may designate the user who wins the game by using the stored identification information after the game ends. In this case, the camera unit 150 may recognize the user who wins the game on the basis of the stored identification information and the illumination unit 143 may output the illumination that condenses light to the designated user who wins the game through the controller 190.

The output unit 140 may also output another form other than a video signal or an audio signal, for example, a signal for notifying the occurrence of the event by vibration. In an aspect of the present disclosure, as illustrated in FIG. 1, the output unit 140 may include the sound output unit 141, the display 142, and the illumination unit 143.

The camera unit 150 includes multiple cameras 151, and as a result, image frames processed by the cameras 151 may be stored in the memory 180 or transmitted to the outside through the network connection unit 160. The camera unit 150 may be constituted by one camera or constituted by two or more cameras according to a use environment.

In an aspect of the present disclosure, at least some cameras of the camera unit 150 may be disposed to photograph an image frame including the dart target 110 and some other cameras may be disposed to photograph an image frame directly related with a game rule in the dart game play. For example, the camera 151 may be disposed to photograph a throw-line on which the dart is thrown in order to photograph the image frame directly related with the dart game rule. The multiple cameras 151 included in the camera unit 150 may be disposed to photograph at least some image frames to overlap with each other. In an embodiment of the present disclosure, when the camera unit 150 includes one camera, the camera may be a panoramic camera disposed to photograph both at least a part of the dart target 110 and the image frame (e.g., the throw-line in the dart game) directly related with the game rule.

In an aspect of the present disclosure the camera unit 150 may be disposed to photograph the throw-line and/or a part of the user. Alternatively, the camera unit 150 may be disposed to photograph at least a part of the dart target 110. This may be a purpose for determining a cheating behavior of the user. The camera unit 150 may perform the aforementioned photographing through one camera or may perform the aforementioned photographing through a plurality of cameras.

Further, in an aspect of the present disclosure, the camera unit 150 photographs the dart pin to input information on the dart pin in the dart game apparatus. For example, a QR code is included in the dart pin to allow the camera unit 150 to recognize the QR code so that information such as a mass, a shape, a length, a material, a manufacturer, and a size of the dart pin may be received. The camera unit 150 may include a function for receiving information on the dart pin such as a QR code reader function, or the like.

The network connection unit 160 may include one or more modules that enable wireless communication between the dart game apparatus 103 and a wired/wireless communication system or between the dart game apparatus 103 and a network on which the dart game apparatus 103 is positioned. In an embodiment of the present disclosure, the network connection unit 160 may include a transmission unit 162 and a reception unit 161.

The reception unit 161 may collect and/or receive the information (e.g., game data, winning or losing information, and item movement information) related to the dart game from the dart game server 101 through the network 108. The reception unit 161 may collect or receive big data such as plural user information from the dart game server 101 and/or an external server. Additionally, the reception unit 161 may receive group information obtained by grouping the user information from the dart game server 101, or the like. Further, the reception unit 161 may receive from the dart game server 101 whether to play the dart game, the winning or losing information of the first user and the second user, and at least one item movement information. Herein, whether to play the dart game may include information such as the game mode information, the real-time match-up mode information, the non-real-time match-up mode information, and the game count information included in the betting dart game request received by the dart game server 101. In this case, the controller 190 may execute the betting dart game based on the aforementioned information. Furthermore, the reception unit 161 may receive an application including the user interface related to the corresponding dart game from the external server other than the dart game server 101. As an example, the reception unit 161 may receive the application related with the corresponding dart game from the dart game company server.

According to an embodiment of the present disclosure, the transmission unit 162 may transmit one or more scores calculated in the betting dart game to the dart game server 101. Further, the transmission unit 162 may transmit the winning or losing information calculated according to the predetermined winning or losing criterion based on one or more calculated scores to the dart game server 101. Herein, a subject calculating the winning or losing information may be performed by the dart game apparatus 103 or by the dart game server 101. Accordingly, the winning or losing information may be received through the reception unit 161 or may be transmitted to the dart game server 101 through the transmission unit 162.

The network connection unit 160 may include a wired/wireless Internet module for accessing the network. As the wireless Internet technology, wireless LAN (WLAN) (Wi-Fi), wireless broadband (Wibro), world interoperability for microwave access (Wimax), high speed downlink packet access (HSDPA), or the like, may be used. As wired Internet technology, a digital subscriber line (XDSL), fibers to the home (FTTH), power line communication (PLC), or the like may be used.

Further, the network connection unit 160 includes a short-range communication module to transmit and receive data to and from an electronic apparatus positioned in a comparatively short-range from the dart game apparatus 103 and including the short-range communication module. As short-range communication technology, Bluetooth, radio frequency identification (RFID), infrared data association (IrDA), ultra wideband (UWB), ZigBee, or the like may be used. In an embodiment of the present disclosure, the network connection unit 160 may sense a connection state of the network and a transceiving speed of the network. Data received through the network connection unit 160 may be output through the output unit 140, stored through the memory 180, or transmitted to other electronic apparatuses positioned in a short-range through the short-range communication module.

According to an embodiment of the present disclosure, the user recognition unit 170 may recognize and/or register the user information received through the reception unit 161. Further, the user recognition unit 170 may recognize and/or register the user information based on an input action of the user. Further, the registered user information may be transmitted to the dart game server 101 through the transmission unit 162. The user recognition unit 170 may recognize long-range user information by using a radio wave by using radio frequency identification (RFID) technology which is a kind of the short-range communication technology. The dart game apparatus 103 may identify the RFID module possessed by the user to identify the dart game user which plays the game by using the dart game apparatus 103 and update a database for the identified dart game user or accumulate new data. In an embodiment of the present disclosure, the user recognition unit 170 may be integrated in the input unit 130. Further, the user recognition unit 170 may receive one or more item information included in the user information from the user equipment. In this case, the memory 180 may store one or more item information and the user information including one or more item information may be registered through the controller 190.

The user recognition unit 170 may include various technologies (e.g., the short-range communication technology such as the Bluetooth, and the like) that may transmit and receive the user information by a contact/non-contact method in addition to the RFID technology. Further, the user recognition unit 170 may include a biodata identification module that identifies biodata (speech, a fingerprint, and a face) of the user by interworking with the microphone, the touch pad, the camera unit 150, and the like of the input unit 130.

The memory 180 may store a program for a motion of the controller 190 therein and temporarily or permanently store input/output data (e.g., item information, user information, a phone book, a message, a moving picture, or the like) therein. The memory 180 may store data regarding various patterns of vibrations and sounds output in the touch input on the touch screen. The memory 180 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The dart game apparatus 103 may operate in connection with a web storage performing a storing function of the memory 180 on the Internet.

The controller 190 generally controls all motions of the dart game apparatus 103. For example, in the case of the dart game, the score sensed through the sensing unit 120 is collected for each user, the collected score is transmitted to and received from another dart game apparatus connected through the network, and a game winning or losing record, the score, and the like according to the collected result are recorded. The controller 190 may perform pattern recognition processing to recognize a motion input, a write input, and the like performed on the touch screen or camera as a text or an image. Further, the controller may perform speech recognition by using a speech-to-text (STT) function to recognize the speech input through the microphone as the text.

As illustrated in FIG. 1, since the controller 190 may communicate with all of the above-mentioned other components, the controller 190 may organically control operations of the corresponding components.

Various embodiments described herein may be implemented in a computer-readable recording medium or a recording medium readable by a device similar to the computer by using, for example, software, hardware, or a combination thereof. According to hardware implementation, the embodiment described herein may be implemented by using at least one of the application specific integrated circuits (ASICs), the digital signal processors (DSPs), the digital signal processing devices (DSPDs), the programmable logic devices (PLDs), the field programmable gate arrays (FPGAs), the processors, the controllers, the microcontrollers, the microprocessors, and the electric units for performing other functions. In some cases, the embodiments described in the specification may be implemented by the controller 190 itself. According to software implementation, embodiments such as a procedure and a function described in the specification may be implemented by separate software modules. Each of the software modules may perform one or more functions and operations described in the specification. A software code may be implemented by a software application written by an appropriate program language. The software code may be stored in the memory 180 and executed by the controller 190.

According to an embodiment of the present disclosure, the dart game apparatus 103 may perform overall operations of the betting dart game. Furthermore, the overall operations of the betting dart game may be performed by the dart game server 101. As an example, the betting dart game method may be performed by hardware of the dart game server 101 or an OS itself. Additionally, information calculated or generated by the dart game server 101 and calculated or generated by the dart game apparatus 103 is received to implement some or all of the betting dart game method.

Figure 4:
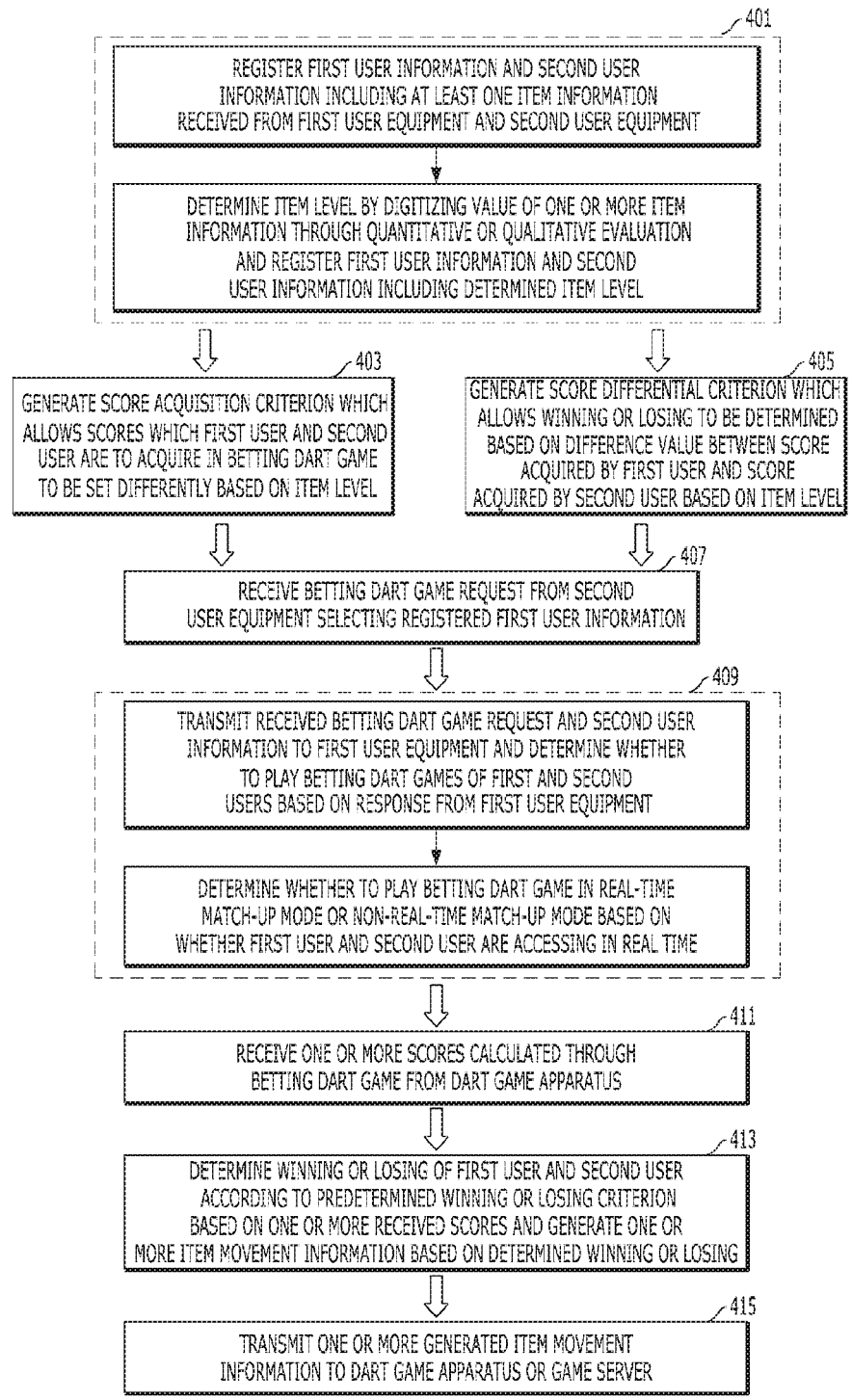
FIG. 4 is a flowchart of a method for providing a betting dart game according to an embodiment of the present disclosure.

FIG. 4 is a flowchart of a method for providing a betting dart game according to an embodiment of the present disclosure.

In an embodiment of the present disclosure, the dart game server 101 may manage a group of one or more dart game apparatuses 103 and communicate with the dart game apparatus 101 and/or the game server 109 through the reception module 201 and the transmission module 203. Further, the method may be performed by an entity (e.g., a network computing entity, etc.) other than the dart game server 101 and the dart game apparatus 103.

Additional steps other than steps illustrated in FIG. 4 may also be included in one aspect of the present disclosure and moreover, some of the steps illustrated in FIG. 4 may be omitted.

According to an embodiment of the present disclosure, the dart game server 101 may register first user information and second user information including at least one item information received from the first user equipment and the second user equipment (401). Further, in step (401), an item level may be determined by digitizing a value of one or more item information through quantitative evaluation or qualitative evaluation. In this case, the control module 205 may register the first user information and the second user information including the determined item level. Further, the control module 205 may also store the registered first user information and second user information in the database module 209. For example, when the item information is a game item (for example, avatar equipment), the control module 205 may digitize the information such as a popularity rank of the game, whether there is item transaction, item transaction cost, and an item scarcity value through the quantitative or qualitative evaluation (e.g., 85/100). The control module 205 may then map digitized (e.g., 85/100) item information to a predetermined level interval (e.g., 90 to 100=LV10, 80 to 90=LV9, 70 to 80=LV8, etc.). As a result, the control module 205 may determine the item level (e.g., LV9) based on the mapped level interval.

Additionally, the control module 205 may generate a score acquisition criterion that allows the first user and the second user to set different scores to be acquired in the betting dart game based on the item level (403). For example, the control module 205 may set scores (e.g., the first user=300 points or more and the second user=450 points or more) to be acquired based on the item level (e.g., item LV9) of the first user and the item level (e.g., item LV8) of the second user. In addition, the control module 205 may execute or propose a re-match when both the first user and the second user acquire the scores to be acquired in the betting dart game. Furthermore, when both the first user and the second user acquire the score to be acquired in the betting dart game or more, the control module 205 may determine winning or losing through a difference of added scores. Alternatively, the winning or losing may be determined according to acquisition rate of the added score in the score to be acquired. Additionally, one or more items may include at least one of a dart game item, a PC game item, a mobile game item, cyber money, and online coupons.

According to an embodiment of the present disclosure, the control module 205 may generate a score differential criterion that allows the winning or losing to be determined based on a difference value between the score obtained by the first user and the score obtained by the second user based on the item level (405). Specifically, the control module 205 may generate the score differential criterion (e.g., the second user wins the game only when acquiring 30 points or more of the score of the first user) based on the item level (e.g., LV9) of the first user and the item level (e.g., LV8) of the second user. As an example, the control module 205 may determine the winning of the second user based on the difference value between a score (e.g., 150 points) obtained by the first user and a score (e.g., 200 points) obtained by the second user. Herein, the control module 205 may generate a reference selection message that allows the user to select the score acquisition criterion and the score differential criterion and transmit the criterion selection message to the user equipment through the transmission module 203. Alternatively, at least one of the score acquisition criterion and the score differential criterion described above may be determined based on the user information and the user level. The score acquisition criterion and the score differential criterion may be determined based on the agreement of the control module 205 of the dart game server 101, the controller 190 of the dart game apparatus or the first user and the second user.

Additionally, the reception module 201 may receive the betting dart game request from the second user equipment selecting the registered first user information (407). Herein, the second user may select the first user information through a user information list provided by the control module 205 and transmit the betting dart game request to the dart game server 101 through the second user equipment based on one or more item information included in the first user information. The betting dart game request described herein may include the game mode information, the real-time match-up mode information, the non-real-time match-up mode information, and the game count information. Further, the game mode information refers to game methods such as a zero-one game, a cricket game, and a count-up game, which are dart game play methods. Furthermore, the information on the game count information such as 2 wins out of 3 games, 3 wins out of 5 games, and 5 wins out of 7 games. Additionally, the user may perform the betting dart game by combining the game mode information and the game count information.

Herein, the dart game server 101 may transmit the received betting dart game request and the second user information to the first user equipment and determine whether the first user and the second user play the betting dart game based on the response from the first user equipment (409). Further, the control module 205 may determine whether to play the betting dart game in the real-time match-up mode or the non-real-time match-up mode based on whether the first user and the second user are accessing in real time. The non-real-time match-up mode described above refers to a match-up mode in which the first user and the second user play the betting dart game during a predetermined time period.

In one aspect of the present disclosure, the reception module 201 may receive one or more scores calculated from the dart game apparatus 103 through the betting dart game (411). Then, the control module 205 may determine the winning or losing of the first user and the second user according to the predetermined winning or losing criterion based on one or more received scores. The predetermined winning or losing criterion described herein may include a first criterion for determining a highest score among one or more scores calculated through the betting dart game as a user score. As an example, the control module 205 may determine the highest score (e.g., 500 points in 3 games) among one or more calculated scores (e.g., 200 points in 1 game, 300 points in 2 games, and 500 points in 3 games) as the user score. Further, the predetermined winning or losing criterion may include a second criterion for calculating an average score of one or more scores calculated through the betting dart game and determining the calculated average score as the user score. For example, the control module 205 may determine the average score (e.g., 300 points) of one or more calculated scores (e.g., 200 points in 1 game, 300 points in 2 games, and 400 points in 3 games) as the user score. In this case, the control module 205 may generate one or more item movement information based on the determined winning or losing (413). Herein, the item movement information may include an algorithm for causing an item to be moved from the user equipment of a loser to the user equipment of a winner in accordance with winning or losing determined based on the predetermined winning or losing criterion. Then, the transmission module 203 may transmit one or more generated item movement information to the dart game apparatus 103 or the game server 109 (415). Additionally, when the control module 205 transmits one or more item movement information to the dart game apparatus 103, the control module 205 may generate the first user information and the second user information to which the algorithm is applied to move the item from the user equipment of the loser to the user equipment of the winner and transmit the generated first and second user information to the dart game apparatus 103 through the transmission module 203.

Additionally, the control module 205 may generate the winning/losing information determined based on the predetermined winning or losing criterion and transmit the generated winning or losing information to the game server 109 through the transmission module 203. In this case, the game server 109 may perform an operation of moving the item through the algorithm that moves the item from the user equipment of the loser to the user equipment of the winner based on the received winning or losing information.

Figure 5:
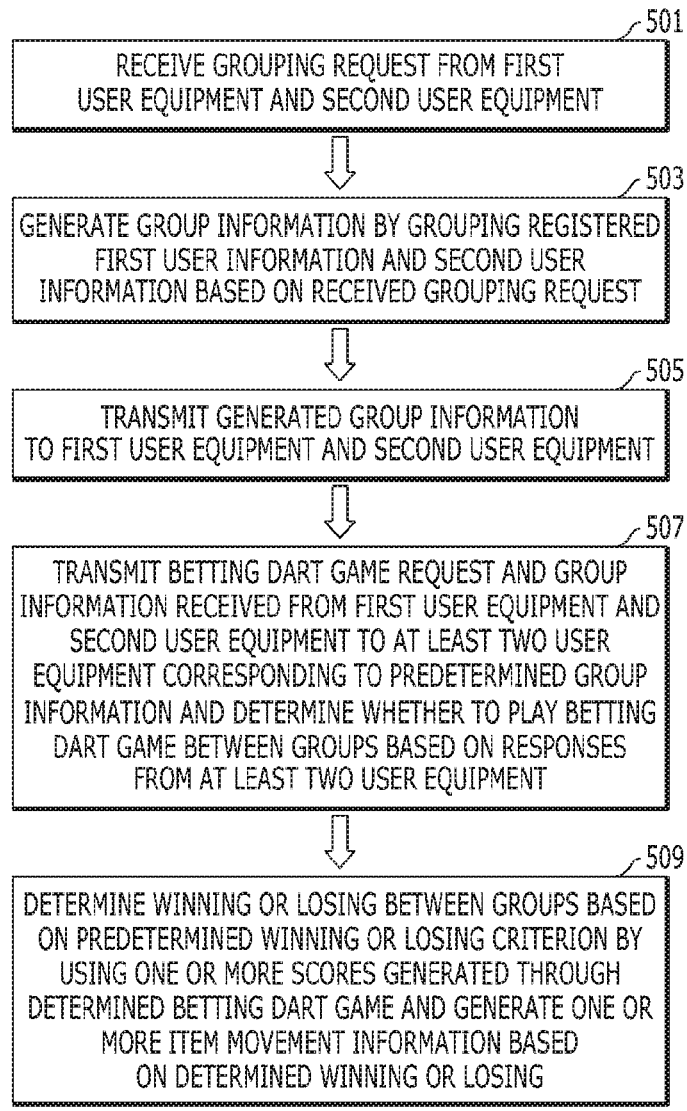
FIG. 5 is a flowchart of a method for providing a betting dart game between groups according to an embodiment of the present disclosure.

FIG. 5 is a flowchart of a method for providing a betting dart game between groups according to an embodiment of the present disclosure.

Additional steps other than steps illustrated in FIG. 5 may also be included in one aspect of the present disclosure and moreover, some of the steps illustrated in FIG. 5 may be omitted or predetermined steps may be added.

According to an embodiment of the present disclosure, the reception module 201 may receive a grouping request from the first user equipment 105 and the second user equipment 107 (501). In this case, the control module 205 may generate group information by grouping the first user information and the second user information based on the received grouping request (503). Additionally, the transmission module 203 may transmit the generated group information to the first user equipment 105 and the second user equipment 107 (505). In this case, the control module 205 may create a standby space which may be connected to the first user equipment 105 and the second user equipment 107 that receive the group information. Further, the control module 205 may also allow one or more user equipment having predetermined other group information to enter the standby space. In addition, the control module 205 may create a standby space which a first user and a second user may allow a user(s) of other groups to enter by selecting one or more user information having predetermined user information.

More specifically, the control module 205 may create a standby space that enables participating in the betting dart game as a user or group. In this case, the reception module 201 may receive standby space application information from one or more user equipment. Further, the control module 205 may connect the standby space to one or more user equipment based on the received standby space application information. Additionally, the transmission module 203 may transmit a selection message which allows the user to select a dart game match-up between individuals or groups in the standby space to the user equipment. In this case, the control module 105 may connect the user equipment with the standby space based on information indicating that the user selects the dart game match-up between the individuals or groups from the user equipment through the selection message. In this case, the control module 205 may invite the user equipment corresponding to predetermined user information among the user information connected to the dart game server 101 to the standby space. In this case, the control module 205 may invite the user equipment corresponding to predetermined user information that is the same or similar in the user's item information, a game level or inter-group level value of the user to the standby space. Further, the control module 205 may generate a user information list from which the user may select predetermined user information. Thus, the user may play the betting dart game by selecting predetermined user information from the user information list.

Further, in step (505), the reception module 201 may receive the betting dart game request from the first user equipment 105 and the second user equipment 107. In addition, the transmission module 203 may transmit the received betting dart game request and group information to two or more user equipment corresponding to predetermined group information.

Then, the control module 205 may determine whether to play the betting dart game between the groups based on responses from at least two user equipment (507). Further, the reception module 201 may receive one or more scores generated through the betting dart game from the dart game apparatus 103. Thereafter, the control module 205 may determine the winning or losing between the groups according to a predetermined winning or losing criterion by using one or more received scores and generate one or more item movement information based on the determined winning or losing (509). According to an additional embodiment of the present disclosure, the control module 205 may generate one or more item movement information based on the winning or losing between the groups. Herein, one or more item movement information may include one or more distribution schemes. For example, one or more distribution schemes may include at least one of a random distribution scheme, a distribution scheme based on a winning contribution, a distribution scheme based on a user level, and a distribution scheme based on a user agreement. The random distribution scheme described herein refers to distribution to each user equipment according to a result of a random function. Additionally, in the distribution scheme based on the winning contribution, items to be distributed to each team member of a victorious group may be distributed according to a game performance score. This distribution scheme based on the winning contribution may be used as a scheme to enhance game achievement of the users. For example, it is assumed that the first user is a user who shows an excellent score between two users of the group and the second user is a user who does not show the excellent score. In this case, the control module 205 may generate item movement information that allows a superior item (e.g., LV9 avatar equipment) among items (e.g., LV9 avatar equipment and LV8 avatar equipment) to be distributed to the first user.

Additionally, the distribution scheme according to the user level may be a scheme that distributes the superior items among the items to be distributed to the user with a high user level. For example, it is assumed that a user having a high user level in a victorious group is the first user and a user having a relatively low user level is the second user. In this case, the control module 205 may generate item movement information that allows a superior item (e.g., LV9 avatar equipment) among items (e.g., LV9 avatar equipment and LV8 avatar equipment) to be distributed to the first user. Additionally, the control module 205 may generate item movement information that allows the item to be distributed based on an agreement between the first user and the second user via a distribution scheme according to a user agreement.

In one or more exemplary implementations, the functions presented herein may be implemented through hardware, software, firmware, or a combination thereof. When the functions are implemented by the software, the functions may be stored in a computer-readable medium as one or more commands or codes or transmitted therethrough. The computer-readable medium includes a computer storage medium and a communication medium including a predetermined medium for easily transferring a computer program from one place to another place. The storage medium may be a predetermined available medium which may be accessed by a universal computer or a special-purpose computer. For example, the computer-readable medium includes a RAM, a ROM, an EEPROM, a CD-ROM, or other optical disk storage media, magnetic disk storage media, or other magnetic storage devices or predetermined other media which may be used to store program code means required as a form of a command or data structure and accessed by a universal computer, a special-purpose computer, a universal processor, or a special processor, but is not limited thereto. Further, predetermine connection means may be regarded as the computer-readable medium. For example, when software is transmitted from a website, a server, or another remote source through wireless technologies such as a coaxial cable, an optical fiber cable, a flexible wire, a digital subscriber line (DSL), or infrared radio, and microwaves, the wireless technologies such as the coaxial cable, the optical fiber cable, the flexible wire, the DSL, or infrared radio, and the microwaves may be included in definition of the medium. disk and disc used herein include a compact disc (CD), a laser disc, an optical disc, a DVD, a floppy disk, a Blu-ray disc and herein the disk magnetically reproduces data, while the disc optically reproduces data through a laser. The combinations may also be included in the range of the computer-readable medium.

It will be well appreciated by those skilled in the art that various exemplary elements, components, logic blocks, modules, and algorithm steps may be implemented by electronic hardware, computer software, or a combination thereof In order to clarify mutual compatibility of hardware and software, various exemplary elements, blocks, modules, and steps are described in functional viewpoints thereof. Whether such a function is implemented by the hardware or the software depends on design limitations given to a specific application and an entire system. Those skilled in the art may implement the functions by various methods with respect to respective specific applications, but the implementation determination does not depart from the scope of the present disclosure.

Various exemplary logic blocks and modules disclosed in association with the disclosure may be implemented or performed through a universal processor, a digital signal processor (DSP), an application specific integrated circuit (ASIC), a field programmable gate array (FPGA), or other programmable logic device, a discrete gate or transistor logic, discrete hardware components, or a predetermined combination designed to implement the functions disclosed herein. The universal processor may be the microprocessor, and in an alternative embodiment, the universal processor may be a conventional processor, controller, microcontroller, or state machine. The processor may be implemented as, for example, combinations of calculation devices such as the DSP and the microprocessor, a plurality of microprocessors, one or more microprocessors coupled with a DSP core, or a combination of the components.

In respect to hardware implementation, various exemplary logics, logic blocks, and modules of processing units described in association with aspects disclosed herein may be implemented in one or more ASICs, DSPs, digital signal processing devices (DSPDs), programmable logic devices (PLDs), field programmable gate arrays (FPGAs), a discrete gate or transistor logic, discrete hardware components, universal-purpose processors, controllers, micro-controllers, microprocessors, other electronic units designed to perform the functions described herein, or a combination thereof. The universal-purpose processor may be the microprocessor, and alternatively, the universal-purpose processor may be a predetermined conventional processor, controller, microcontroller, or state machine. The processor may also be implemented as combinations of computing devices (for example, combinations of the DSP and the microprocessor, the plurality of microprocessors, and one or more microprocessors connected with the DSP core, or a predetermined other appropriate configuration). Additionally, at least one processor may include one or more modules which may implement one or more steps and/or operations among the steps and/or operations described herein.

Moreover, various aspects or features described herein can be implemented as methods, apparatuses, or manufactured articles using standard programming and/or engineering techniques. Steps and/or operations of a method or algorithm described in association with the aspects disclosed herein can be directly implemented as hardware or as a software module executed by a processor, or a combination thereof. Additionally, in some aspects, the steps or operations of the method or algorithm can be present as at least one or predetermined combination of sets of codes or commands on a machine-readable or computer-readable medium and this can be integrated into a computer program article. The terms manufactured article as used herein is intended to include a computer program accessible by a predetermined appropriate computer-readable device or medium.

The description of the presented embodiments is provided so that those skilled in the art of the present disclosure use or implement the present disclosure. Various modifications of the embodiments will be apparent to those skilled in the art and general principles defined herein can be applied to other embodiments without departing from the scope of the present disclosure. Therefore, the present disclosure is not limited to the embodiments presented herein, but should be analyzed within the widest range which is coherent with the principles and new features presented herein.

MODE FOR INVENTION

Related contents in the best mode for carrying out the present disclosure are described as above.

INDUSTRIAL APPLICABILITY

The present disclosure may be used in a digital device, a dart device, a dart game device, an entertainment device, a dart server, and the like.

The invention claimed is:

1. A method for providing a betting dart game, performed on one or more processors of a dart game server, the method comprising:
receiving at least one of item information for one or more items from a first user equipment and a second user equipment by a reception module;
evaluating the item information as a numerical value based on at least one of a popularity of the game, whether there is an item transaction, an item transaction cost or an item scarcity value by a control module;
determining a mapped level interval by mapping the numerical value to a predetermining level interval by the control module;
determining an item level based on the mapped level interval by the control module;
registering first user information and second user information including the item level by the control module;
generating a score acquisition criterion which allows scores which the first user and the second user are to acquire in the betting dart game to be set differently based on the item level by the control module;
receiving a betting dart game request from the second user equipment that selects the registered first user information by the reception module;
transmitting the received betting dart game request and the second user information to the first user equipment by a transmission module and determining whether to play the betting dart games of first and second users based on a response from the first user equipment by the control module;
receiving one or more scores calculated through the betting dart game from a dart game apparatus by the reception module;
determining winning or losing of the first user and the second user according to a predetermined winning or losing criterion based on the one or more received scores and generating one or more item movement information based on the determined winning or losing by the control module; and
transmitting one or more generated item movement information to the dart game apparatus or a game server by the transmission module,
wherein the predetermining level interval comprises ranges of numerical values corresponding to each of a plurality of predetermined item levels, and wherein the item movement information includes an algorithm for causing a movement of the one or more items based on the item level from the user equipment of a loser to the user equipment of a winner in accordance with winning or losing determined based on the predetermined winning or losing criterion.

2. The method of claim 1, wherein the one or more items include at least one of a dart game item, a PC game item, a mobile game item, cyber money, and online coupons.

3. The method of claim 1, wherein the betting dart game request includes game mode information, real-time match-up mode information, non-real-time match-up mode information, and game count information.

4. The method of claim 3, wherein the determining of whether to play the betting dart game includes determining whether to play the betting dart game in a real-time match-up mode or a non-real-time match-up mode based on whether the first user and the second user are accessing in real time, and
the non-real-time match-up mode includes a match-up mode in which the first user and the second user play the betting dart game during a predetermined time period.

5. The method of claim 1, wherein the predetermined winning or losing criterion includes
a first criterion to determine a highest score among one or more scores calculated through the betting dart game as a user score, and
a second criterion to calculate an average score of one or more scores calculated through the betting dart game and determine the calculated average score as the user score.

6. The method of claim 1, further comprising:
generating a score differential criterion which allows winning or losing to be determined based on a difference value between the score acquired by the first user and the score acquired by the second user based on the item level.

7. The method of claim 6, wherein the score acquisition criterion and the score differential criterion are determined based on an agreement of a control module of a dart game server or a controller of the dart game apparatus or the first user and the second user.

8. The method of claim 1, further comprising:
receiving a grouping request from the first user equipment and the second user equipment;
generating group information by grouping the registered first user information and second user information based on the received grouping request; and
transmitting the generated group information to the first user equipment and the second user equipment,
wherein the receiving of the betting dart game request includes receiving the betting dart game request from the first user equipment and the second user equipment that select predetermined group information.

9. The method of claim 8, wherein the determining of whether to play the betting dart game includes transmitting the betting dart game request and the group information received from the first user equipment and the second user equipment to at least two user equipment corresponding to the predetermined group information and determining whether to play the betting dart game between groups based on responses from at least two user equipment, and
the generating of the one or more item movement information includes determining winning or losing between the groups based on the predetermined winning or losing criterion by using one or more scores generated through the determined betting dart game and generating the one or more item movement information based on the determined winning or losing.

10. A computer program stored in a non-transitory computer readable medium and causing a computer to execute the operations, the operations comprising:
an operation of receiving at least one of item information for one or more items from a first user equipment and a second user equipment
an operation of evaluating the item information as a numerical value based on at least one of a popularity of the game, whether there is an item transaction, an item transaction cost or an item scarcity value;
an operation of determining a mapped level interval by mapping the numerical value to a predetermining level interval;
an operation of determining an item level based on the mapped level interval;
an operation of registering first user information and second user information including the item level;
an operation of generating a score acquisition criterion which allows scores which the first user and the second user are to acquire in the betting dart game to be set differently based on the item level;
an operation of receiving a betting dart game request from the second user equipment that selects the registered first user information;
an operation of transmitting the received betting dart game request and the second user information to the first user equipment and determining whether to play the betting dart games of first and second users based on a response from the first user equipment;
an operation of receiving one or more scores calculated through the betting dart game from a dart game apparatus;
an operation of determining winning or losing of the first user and the second user according to a predetermined winning or losing criterion based on the one or more received scores and generating one or more item movement information based on the determined winning or losing; and
an operation of transmitting one or more generated item movement information to the dart game apparatus or a game server.
wherein the predetermining level interval comprises ranges of numerical values corresponding to each of a plurality of predetermined item levels, and
wherein the item movement information includes an algorithm for causing a movement of the one or more items based on the item level from the user equipment of a loser to the user equipment of a winner in accordance with winning or losing determined based on the predetermined winning or losing criterion.

* * * * *